Figure 1:
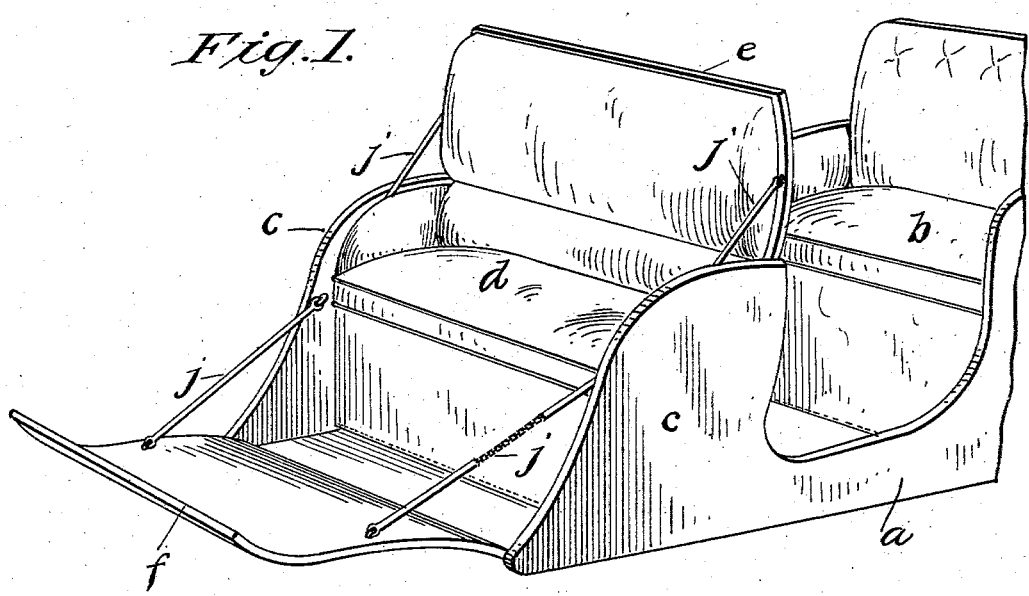

No. 740,895. PATENTED OCT. 6, 1903.
C. J. MOORE.
VEHICLE BODY.
APPLICATION FILED DEC. 8, 1902.
NO MODEL.

Witnesses:
Inventor.
Chas. J. Moore
by
Attorneys:

No. 740,895. Patented October 6, 1903.

UNITED STATES PATENT OFFICE.

CHARLES J. MOORE, OF WESTFIELD, MASSACHUSETTS, ASSIGNOR TO "LOCOMOBILE" COMPANY OF AMERICA, OF BRIDGEPORT, CONNECTICUT, A CORPORATION.

VEHICLE-BODY.

SPECIFICATION forming part of Letters Patent No. 740,895, dated October 6, 1903.

Application filed December 8, 1902. Serial No. 134,330. (No model.)

*To all whom it may concern:*

Be it known that I, CHARLES J. MOORE, a citizen of the United States of America, residing at Westfield, in the county of Hampden and State of Massachusetts, have invented new and useful Improvements in Vehicle-Bodies, of which the following is a specification.

This invention relates to the improvement in the construction of automobile vehicles, the object of the invention being to provide an auxiliary seat for the vehicle located in front of the main seat, which auxiliary seat is adapted to be concealed when not in use within a box-like structure which constitutes normally the dashboard of the vehicle, the forward side of which is divided transversely, one portion swinging outwardly and downwardly to constitute a footboard and the other portion swinging upwardly to constitute a back for the seat, both seats facing forward.

The invention is fully illustrated in the drawings forming part of this application, in which—

Figure 2:
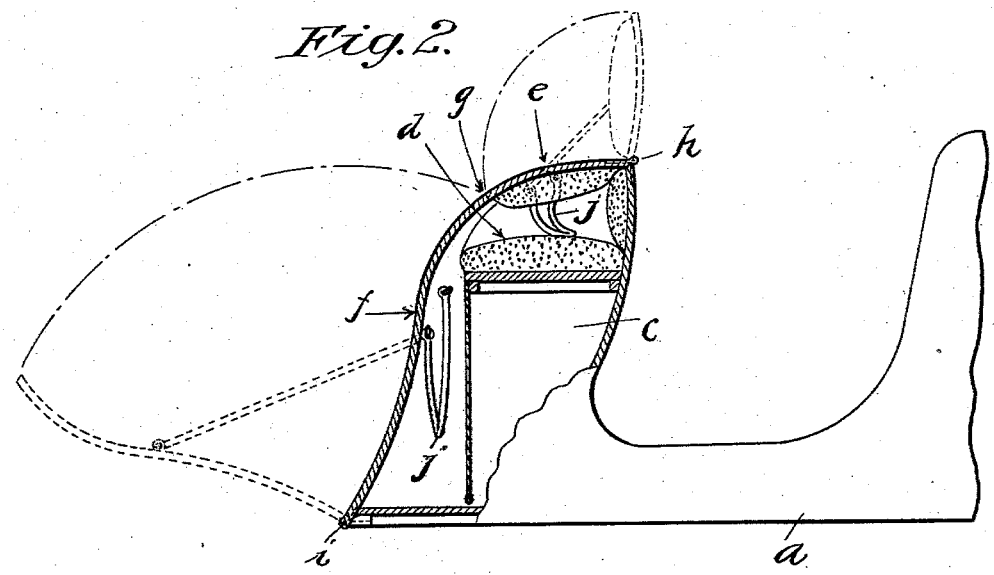

Figure 1 is a perspective view of a portion of a vehicle-body having my invention applied thereto, the forward seat being shown in its exposed position ready for use. Fig. 2 is a side elevation, partly in section, of a portion of a vehicle-body, showing in section the seat in its inclosed position and in dotted lines showing the open position of the back of the seat and the footboard therefor.

Referring to these drawings, $a$ may indicate the vehicle-body, having the usual seat $b$. In place of the ordinary dash the forward part of the vehicle is provided with a box-like structure $c$, adapted to contain a seat $d$, the latter being entirely concealed within said structure $c$ when not required for use.

For the purpose of giving the vehicle-body a graceful outline this box-like structure $c$ when viewed from the side sweeps forwardly and downwardly on a reversed curved line and forming where it intersects the base-line of the vehicle a relatively sharp angle. This particular outline of the structure $c$, however, forms no part of the invention. The forward side of this structure $c$ is made up of two portions, (indicated, respectively, by $e$ and $f$,) the dividing-line between them in this case being located at $g$; but the location of this meeting line may be varied to provide a higher or lower seat-back. The part $e$ is hinged at $h$ to the upper edge of the rear side of the structure $c$, and the part $f$ is hinged at $i$ to the lower forward edge thereof. Any suitable means may be provided for limiting the swinging movement of either of these parts away from said structure $c$—as, for example, the flexible connections $j$. These I make, preferably, in the form of a chain covered with a leather tube. The part $e$ when it is opened up to a substantially vertical position, as shown in Fig. 1, constitutes the back of the seat $d$ and to that end is suitably upholstered on its inner side, as shown.

The part $f$ when swung down to the position shown in Fig. 1 constitutes not only a foot-rest for the persons occupying the seat, but also a dash for said front seat. When it is not desired to use this seat, the parts $f$ and $e$ are swung inwardly to the position shown in Fig. 2, completely inclosing the seat, whereby it is not only hidden from view, but protected from dust, and at the same time when the seat is thus inclosed the inclosing structure does not detract from the appearance of the vehicle.

When the front seat is inclosed, as in Fig. 2, the structure $c$ constitutes a dash for the seat $b$.

While this invention has been described herein as an improvement in vehicle-bodies broadly, it is as a matter of fact more particularly adapted to use on the bodies of automobile vehicles, and such is its generally accepted application; but I do not wish to have it understood that the invention is confined to such use. It affords a very convenient and novel method of constructing a vehicle-body which is convertible from a one to a two seated vehicle, or vice versa, at the pleasure of the owner and forming in either shape a very comfortable vehicle, as well as one pleasing to the eye.

Having thus described my invention, what I claim, and desire to secure by Letters Patent of the United States, is—

1. A motor-vehicle body comprising a forwardly-facing main seat and a dasher-box in front of and protecting said seat and inclosing a second, front seat, which is normally concealed within said dasher-box, a portion of the front wall of said dasher-box opening outwardly and downwardly to constitute a footboard, and another portion thereof opening outwardly and upwardly and relative to said front seat to constitute a forwardly-facing back for said front seat, with means to support said front-wall portions when in open position.

2. In a motor-vehicle a body having a forwardly-facing main seat, a dasher-box in front of said seat and separated therefrom by an entrance-exit passage, said dasher-box comprising fixed sides, a front seat arranged between said sides, a dasher-box top having movement relative to said sides and front seat into position to serve as a forwardly-facing front-seat back, also as a movable front wall for said passage-way, and a dasher-box front movably mounted to enable it to be dropped for a front-seat footboard, said dasher-box top and front, when closed, serving to conceal said front seat.

3. In a motor-vehicle a body having a forwardly-facing main seat, a dasher-box in front of said seat and separated therefrom by an entrance-exit passage-way, said dasher-box comprising fixed sides, a front seat arranged between said sides, a dasher-box top mounted to swing about its rear edge and relative to said front seat into position to serve as a forwardly-facing front-seat back, whereby said top may be opened and closed without intrusion upon the dasher-box interior, and a dasher-box front movably mounted to enable it to be dropped for a front-seat footboard, said dasher-box top and front when closed serving to conceal said front seat.

4. The combination in a vehicle, of a front seat, a forwardly-folding back for the same, a rearwardly-folding footboard uniting with said back to cover said seat, and a rigid back to the upper edge of which said folding back is hinged and which unites with the folded back and footboard to inclose said seat.

5. The combination in a vehicle, of a front seat, a forwardly-folding back for the same, a rearwardly-folding footboard uniting with said back to cover said seat, a rigid back to the upper edge of which said folding back is hinged, and rigid sides between which said seat is supported and inclosed.

6. The combination in a vehicle of a front seat, a forwardly-folding back for the same, a rearwardly-folding footboard uniting with said back to cover said seat, and a rigid back relative to the upper edge of which said folding back moves and which unites with said folding back and footboard to inclose said seat.

CHAS. J. MOORE.

Witnesses:
H. A. CHAPIN,
FRANK B. MITCHELL.